Figure 1:
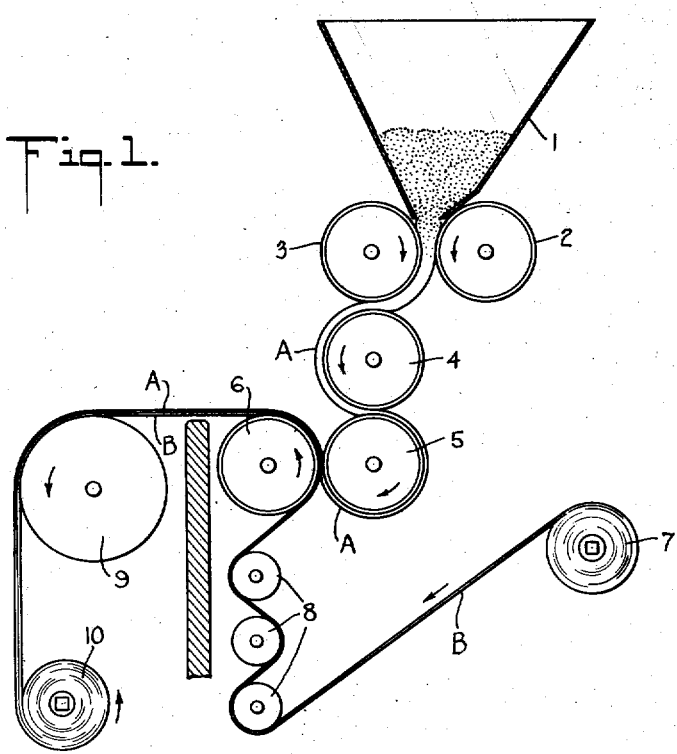

Feb. 16, 1937.  H. JENETT  2,070,600
PROCESS OF COATING
Filed July 22, 1933  2 Sheets—Sheet 1

INVENTOR
Henry Jenett
BY
ATTORNEYS

Feb. 16, 1937. H. JENETT 2,070,600
PROCESS OF COATING
Filed July 22, 1933   2 Sheets-Sheet 2

INVENTOR
Henry Jenett
BY
ATTORNEYS

Patented Feb. 16, 1937

2,070,600

UNITED STATES PATENT OFFICE 2,070,600

PROCESS OF COATING

Henry Jenett, Englewood, N. J., assignor to Celanese Corporation of America, a corporation of Delaware Application July 22, 1933, Serial No. 681,689

14 Claims. (Cl. 91—70)

This invention relates to the coating of articles with compositions comprising thermoplastic compounds, and relates more particularly to the application of coatings comprising derivatives of cellulose to surfaces with the aid of heat and without the use of volatile solvents or extraneous adhesives.

This application is in part a continuation of my copending applications Serial Nos. 641,233 filed November 4, 1932, 663,344 filed March 29, 1933 and 671,642 filed May 18, 1933.

An object of my invention is to form coatings on surfaces in a simple, economical and expeditious manner by causing layers of thermoplastic compositions to adhere to such surfaces by means of heat that is applied in such a manner that firmly adhering coatings are formed. Another object of my invention is to prepare coatings of compositions comprising derivatives of cellulose upon surfaces which heretofore could not be coated successfully with such compositions. Other objects of this invention will appear from the following detailed description.

In the coating of fabrics and the like for the preparation of artificial leather and the like, solutions comprising derivatives of cellulose dissolved in volatile solvents are employed. This method is open to many serious objections, such as the expense, toxicity and fire hazards of the volatile solvent employed and the large number of successive coatings required to build a layer of even the minimum thickness required to hide the texture of the fabric. In the coating of wood or other porous surfaces, when solutions of derivatives of cellulose in volatile solvents are used as coating compositions they do not fill, but tend to bridge over the grain and therefore such surface must be previously treated with fillers and the like. When hard wood, metallic or other surfaces are to be coated, ordinary solutions of derivatives of cellulose in volatile solvents cannot be used because of the lack of adhesion of the resulting film to such surfaces, and therefore it is necessary to incorporate in such solutions, in order to impart the necessary adhesive properties to the resulting film, substances such as gums or resins which introduce complications such as lack of compatibility with the derivative of cellulose, poor lightfastness and water resistance, and tendency to develop brittleness.

I have found that the disadvantages arising from the use of solutions of derivatives of cellulose in volatile solvents and the other expedients previously proposed for coating surfaces with derivatives of cellulose not only may be overcome, but products of superior properties may be obtained, by applying layers comprising derivatives of cellulose or other thermoplastic compounds and other desired constituents but containing no, or substantially no, volatile solvents or liquids directly to the surface to be coated solely by means of heat and pressure, and without the aid of adhesives. In order to obtain the proper bonding action and to avoid over-heating of the thermoplastic composition and the consequent deleterious effects, the surface to be coated should preferably be preheated to a temperature of at least equal to that required to render the composition to be applied plastic, while the thermoplastic composition itself is also preferably preheated, so that upon the application of pressure, a firmly adherent union is obtained. After the application of heat and pressure, the coated or laminated product is cooled or chilled, preferably through the layer or article that has been coated. In this manner, the maximum heating and chilling effects are obtained in the most important location, namely the surface contact of the thermoplastic composition and the article that is coated, so that a perfect bond is obtained.

Any suitable organic thermoplastic compound may be employed in this invention. For instance I may employ derivatives of cellulose such as cellulose nitrate or organic derivatives of cellulose. The organic derivatives may be organic esters of cellulose such as cellulose acetate, cellulose formate, cellulose propionate or cellulose butyrate, or cellulose ethers such as ethyl cellulose, methyl cellulose and benzyl cellulose. Less preferably, thermoplastic compounds other than derivative of cellulose, such as halogenated rubber, vinyl resins and the like may be employed in this invention.

Any desired modifying agent for the thermoplastic compound may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, resins, oils, etc. Examples of plasticizers are camphor, dibutyl phthalate, diethyl phthalate, tricresyl phosphate, triphenyl phosphate, ethyl para toluene sulfonamid, etc., the choice of plasticizer depending upon the properties of the thermoplastic compound employed as the base.

The thermoplastic composition may be applied to or laminated with the surface to be treated while in any suitable form. Thus a layer of an intimate mixture of a derivative of cellulose and plasticizer containing substantially no volatile solvents and in the form of powder may be applied to the preheated surface to be coated, and the assembly pressed at elevated temperatures. While such powder may be prepared in any suitable manner, best results are obtained with the use of a powder formed by simultaneously grinding and dispersing a derivative of cellulose and plasticizer in the presence of a liquid that is a non-solvent for the derivative of cellulose, by forcing the suspension of the derivative of cellulose, plasticizer and non-solvent liquid in a colloid mill between two discs having opposing abrasive surfaces and having a relatively opposite rotating movement, as is described in my said application S. No. 663,344. Alternatively, the thermoplastic composition may comprise an intimate mixture of derivative of cellulose, plasticizer and rubber made in a similar manner, as is described in my said application S. No. 671,642.

If desired the thermoplastic composition may be applied to the surface to be coated while in the form of foils, films or sheets having a thickness of say less than 0.001" to 0.050" or more, which may be previously formed in a separate operation in any suitable manner, such as by casting solutions of the constituents in volatile solvents upon smooth surfaces, cutting from blocks formed in the manner ordinarily employed in the derivative of cellulose plastic industry, or by rolling between heated rolls a molding composition containing substantially no volatile solvent and comprising the derivative of cellulose and plasticizer.

However for ease of manipulation and in order to avoid the cost of forming such sheets or films as a separate operation and also the danger of contamination of the same through handling, I prefer to form the sheets, films or foils in an operation continuous with that in which they are applied to the desired base or surface. In this case the thermoplastic composition, in the form of a powder comprising an intimate mixture of derivative of cellulose and plasticizer, such as is described in my application S. No. 663,344, or comprising an intimate mixture of derivative of cellulose, plasticizer and rubber, as is described in my said application S. No. 671,642, or in any other form, such as grains, blocks, slabs or strips, may be passed between heated rolls that are so spaced that foils, films or sheets of any desired thickness, say from less than 0.001" to 0.050" or more are formed. The foils or sheets thus produced are then passed continuously in juxtaposition to the surface to be coated whereupon heat and pressure are applied for the lamination.

By so forming the plastic sheet or foil continuously with the coating operation, a great saving in time is effected, since only a short contact under pressure is required to obtain the proper bonding action, as both the base and the plastic sheet are suitably preheated. Since the plastic gradually absorbs heat as it passes from roller to roller, it does not blister and is of uniform texture and even gauge throughout and is free of air bubbles irrespective of its thickness. Neither excessive heat nor pressure is required in the coating or laminating operation so that even application is assured.

In the coating operation it is of importance that the surface of the article to be coated should be of sufficiently high temperature. In order to attain such temperatures, the articles should either be preheated prior to the application of the thermoplastic composition, or else when pressure is applied to the assembly, the surface pressing against the article or base should be at a higher temperature than the surface pressing against the thermoplastic composition. Preferably both expedients should be used. In this manner the necessity of causing the required heat to pass through the layer of thermoplastic composition to the surface of contact between it and the base is avoided, so that the deleterious effect of excess heat on thermoplastic compositions is obviated.

After the layer of thermoplastic composition has been caused to adhere to the base by the application of pressure, in order to prevent the thermoplastic layer from drawing up and away from the base no chilling is preferably applied to this surface. On the contrary cooling is effected by chilling applied to the under side of the plastic sheet and through the base, which chilling effect causes the plastic sheet to shrink into the pores or interstices of the base, into which it was previously drawn due to the excessive heat applied from that side.

While any suitable mechanical devices, such as presses, may be employed for obtaining the required heating, pressing and cooling effects, I prefer to employ rolls for this purpose, and indeed one of the advantages of my invention is that it permits the coating of surfaces with derivative of cellulose plastics by means of rolls, which render possible an extremely high rate of production.

By my invention surfaces of all kinds may be coated. Woven, knitted fabrics made of cotton or other fibres may be coated by this invention, as may also paper, cardboard, pulp, leather and other flexible articles. Sheets, blocks or other articles made of wood, cork, rubber, asbestos board or other relatively porous materials likewise may have a coating of a thermoplastic composition applied thereto. Metals such as steel, iron, nickel, copper, aluminum, in sheet, strip or other form, glass, slate and other hard and smooth surfaces may likewise be successfully coated. Not only may relatively wide, thin articles such as plates, fabrics and the like be treated by this invention, but continuous lengths of ribbons, rods, profile strips, tubes, moldings, corset stays, insulated wire, lead pencils and the like may have a coating of thermoplastic compounds applied on all surfaces thereof by this invention.

Another application of this invention is in the preparation of specialties, such as netting of cotton, reconstituted cellulose and the like that is covered with a thin layer of thermoplastic composition and adapted to be used in the making of transparent mothproof clothes bags or for wrapping purposes. Likewise woven wire cloth of various mesh, from fine insect screening to chicken fencing, may have the layer of thermoplastic composition applied thereto in order to close the interstices with a transparent or translucent film of cellulose derivative composition and the resulting product may be used as glass substitutes in poultry houses, greenhouses, storerooms, warehouses and the like. For making such materials, the cloth or reticulated material and the layer of thermoplastic composition are caused to pass between the heated rollers; the film being deposited in the meshes without bubbles or so-called "crater" effects, which occur when a solution of a cellulose derivative in volatile solvent is applied to such materials.

Figure 2:
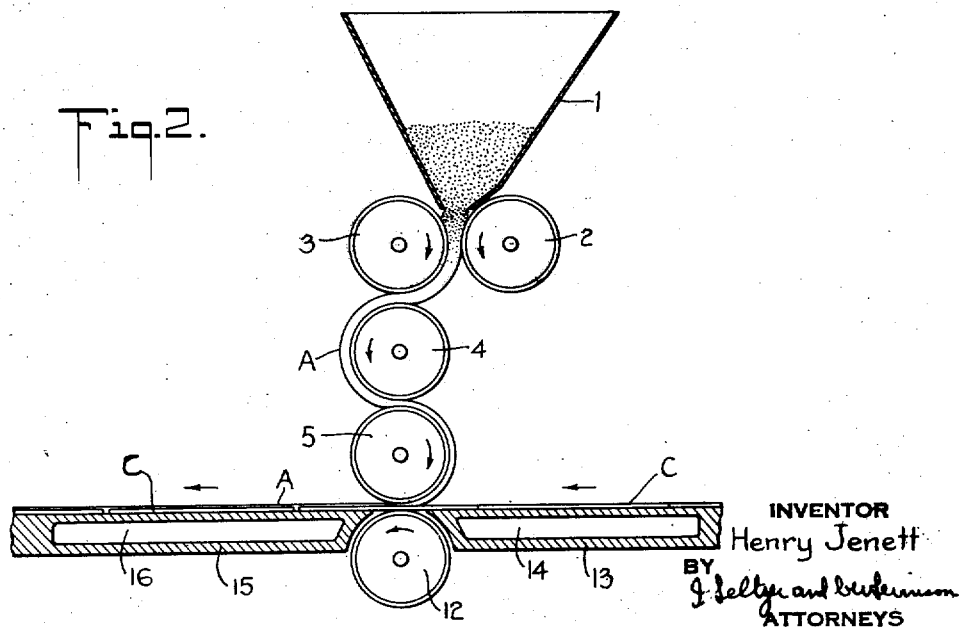
Figure 3:
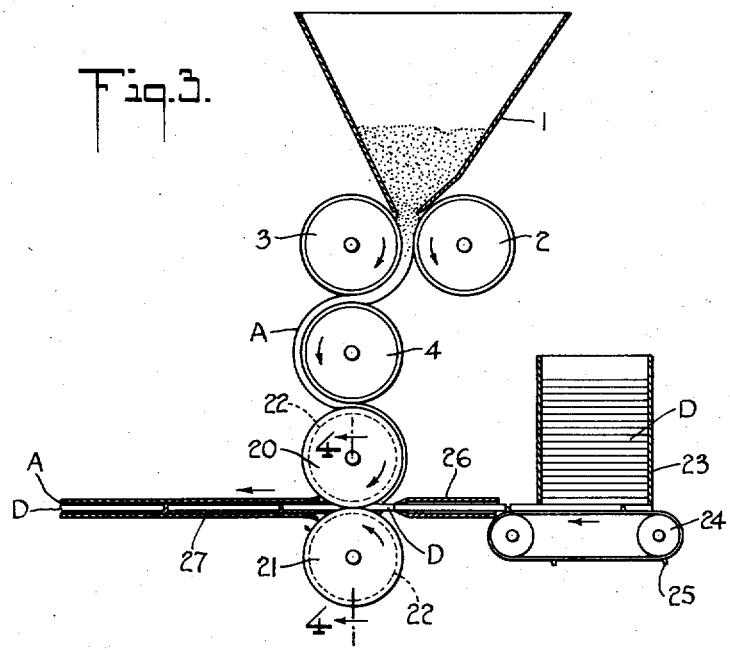
Figure 4:
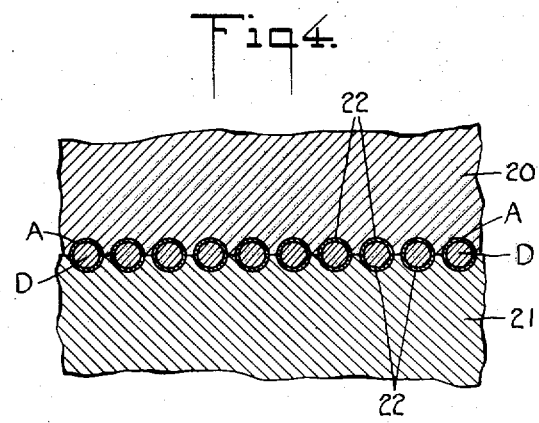

Reference is had to the accompanying drawings which show several of the many means for carrying out my invention, wherein Fig. 1 is a diagrammatic view of apparatus for applying coatings to fabrics, paper or other continuous flexible material, Fig. 2 is a showing of apparatus adapted to be used for the coating of sheets of rigid material, Fig. 3 is a diagrammatic view of apparatus adapted to apply coatings on the surfaces of rod-like articles, and Fig. 4 is a cross section on a large scale along the lines 4—4 of Fig. 3.

Referring to Fig. 1, a hopper 1 is provided for containing the thermoplastic composition, which passes between the heated rolls 2, 3. The rolls 2, 3 are spaced so as to cause the formation of a film or sheet A of the thermoplastic material of desired thickness. This sheet is then passed between heated rolls 4 and 5 and then between the rolls 5 and 6.

The rolls 2, 3, 4, 5 and 6 may be of the ordinary type used for calendering, and may be made of steel, chilled iron or similar material. They may be cored or hollow to provide for the introduction of superheated steam, steam under pressure or any other heating medium. Alternatively the rolls may be solid, in which case the heat may be applied by contact to the surface of the rolls. The heating means, which may be electric resistance coils, gas burners, heated oil or steam, may be arranged so as to produce variable temperatures on the different rollers. The rollers may be driven by ordinary friction gears, or they may be geared to be driven optionally at uniform or at variable speeds, depending upon whether the plastic is to be calendered on or to be frictioned onto the surface.

A roll 7 of paper, cardboard, fabric or any other flexible base B, which it is desired to cover with, or laminate or bond to a cellulose derivative layer is provided. This flexible base B is passed over a series of heated pipes or hot revolving drums 8, so that it is preheated and then in contact with the layer A between the rolls 5 and 6 after which the assembly is passed round the roll 9 which is cooled by brine and then wound up in the form of roll 10.

Referring to Fig. 2, which shows apparatus for coating thermoplastic compositions on to rigid bases such as wood panels, asbestos board, sheet or strip metal, the hopper 1 and rolls 2, 3, 4 and 5 are similar to that shown in Fig. 1. Below the roll 5, a heated roll 12 is provided. The sheets C to be coated are fed through suitable conveying means over the platen or table 13 which is provided with a heating chamber 14, then between the heated rolls 5 and 12 where the layer A of thermoplastic composition is pressed thereon and then over the platen or table 15 which is cooled by means of cold brine or other cooling medium circulating in the chamber 16.

The upper surfaces of the platens 13 and 15 are preferably on a level with the crown of the roller 12. The relation of these platens to this roller remains permanent, so that when this roller 12 is raised or lowered to narrow or to enlarge the space between it and the roller 5, the tables or platens are raised or lowered with it.

Referring to Figs. 3 and 4, apparatus is shown for the coating of rods, wires, tubes and the like which are to be entirely surrounded with the thermoplastic composition. In this case the hopper 1 and rolls 2, 3 and 4 are similar to those shown in Fig. 1. The rollers 20 and 21, which are heated in a manner similar to rolls 5 and 6 of Fig. 1, are provided with circumferential grooves 22, the cross-section of each groove being that of a semi-circle. These rollers 20 and 21 are closely fitted, so that their grooves 22 form circular passageways through which the pencils D or other similar cylindrical objects are caused to pass.

The pencils D are supplied from the magazine 23 on to the conveyor 24 which is provided with lugs 25 that force the pencils D through the heated passageway 26 into the grooves 22 of the rolls 20 and 21. Preformed thermoplastic layer A is forced into the channels 22, since the rolls 20 and 21 are set hard face to face, and in such channels are caused to pass around the articles D passing therethrough and thus surround them with a perfect homogeneous coating of a definite thickness.

The channels 22 may be suitably engraved or treated so that they will impart to the coatings either a highly polished surface, an eggshell finish, an embossed design or any trade-mark lettering or insignia desired.

The coated article D passes from between the roll 20 and 21 through the chamber 27 where it is cooled.

In order further to illustrate my invention but without being limited thereto, the following specific examples are given.

*Example I*

The following is an example of a method of coating a woven cotton fabric to form artificial leather, reference being had to Fig. 1.

|  | Parts by weight |
|---|---|
| Cellulose acetate | 10 |
| Triphenyl phosphate | 3 |
| Ethyl paratoluene sulfonamide | 1 |
| Dimethyl phthalate | 2 |
| Linseed oil | 4 | are suspended in 40 to 60 parts by weight of water. The suspension is fed to a colloid mill where it is forced between two closely spaced carborundum discs, one of which is stationary and the other is rotating at a speed of about 3600 R. P. M.

The resulting product is freed of water by evaporation, and the dry powder is then introduced into the hopper 1 of Fig. 1 and caused to pass between the rolls 2 and 3, which are heated to a temperature of 125° C. The rolls 2 and 3 are spaced at a distance of about 0.125″. The resulting sheet A is then passed between the rolls 3 and 4, and then between the rolls 4 and 5, the distance between the rolls progressively diminishing so that the layer A has a thickness of about 0.03″ when it is to be composited with the fabric B. The temperature of the roll 4 is about 140° C. while the temperature of the roll 5 is about 150° C. The plastic mass becomes more plastic and more uniformly dense in texture as the heat is gradually increased.

The woven cotton fabric B from roll 7 is passed around the heated tubes or rotating drums 8 which are heated to about 175° C., and then around the roll 6 which is also heated to about 175° C. where the layer A of the thermoplastic composition is pressed thereon between the rolls 5 and 6. The fabric is thus preheated in its passage around the heating elements 8, whereby all traces of moisture are removed, and the pores and interstices of the same are expanded so that the fabric readily draws and absorbs the plastic layer A when the materials contact with each other under the moderate but steady pressure exerted by the rolls 5 and 6, which are spaced so as to permit only a predetermined thickness of the plastic material to be deposited in the fabric.

It will be noted that the roll 6 is maintained at higher temperature than any of the other rolls and that the fabric B contacts therewith so that the heat from this roll 6 is transmitted to the surface of contact of fabric and plastic composition through the fabric.

The layer of plastic composition assumes a surface finish as smooth as that of the roll 5, and although the other side of this layer loses its smooth finish by flowing into the interstices and pores of the heated fabric B, the texture and density of the plastic is such that the top surface shows practically no distortion, so that even very thin layers or films of the plastic effectually hide the woven structure of the fabric despite the fact that its anchorage to the base is perfect.

Immediately after the plastic layer has been composited to the fabric by means of the rolls 5 and 6, the assembly is passed around the roll 9 which is cooled by brine or other cooling medium to 0° C. or less, the fabric side of the assembly contacting with this roll, and then is wound up in the form of the roll 10. This chilling effect shrinks the fabric effectively and almost instantly on to the plastic thus producing a positive and permanent bond between them. The coated or laminated product may then be conditioned to absorb the amount of moisture that was removed from the fabric in the course of the above described heat treatment.

The rolls may be driven at such a peripheral speed as to cause the material to move at the rate of 10 yards per minute.

The coated fabric may be used as such, or it may be embossed or otherwise finished to obtain any desired effects.

*Example II*

The following is an example of a method of coating sheet metal, which method is generally applicable to the treatment of rigid bases, such as wood panels, slate, asbestos board and the like, reference being had to Fig. 2.

| | Parts by weight |
|---|---|
| Cellulose acetate | 10 |
| Triphenyl phosphate | 3 |
| Ethyl paratoluene sulfonamide | 1 |
| Diethyl phthalate | 2 |
| Chrome yellow | 10 | are suspended in 45 parts by weight of water. This mixture is subjected to the dispersing and grinding action described in Example I. The resulting mass is then freed of water by evaporation in any suitable manner and the dry powder formed is introduced into the hopper 1 (Fig. 2) and a layer or film A of plastic material is formed by rolls 2, 3, 4 and 5 in a manner similar to that described in connection with Example I.

Plates or sheets C of iron, steel, copper, aluminum or the like are preheated by causing them to pass by suitable conveying means over the table 13 which is heated to a temperature of 180° C. by means of superheated steam, steam under pressure, hot oil or any other suitable heating medium. They are then composited with the plastic layer A between the rolls 5 and 12, the roll 12 which contacts with the metal plates having a temperature of about 175° C. and therefore being hotter than any of the other rolls. The assembly is then passed over the table 15, which is cooled to 0° C. or less by cold brine circulating in the chamber 16, and the chilling effect through the metal plate C causes the shrinking action which produces a firm bond or union.

A remarkable feature of this process is that by applying the heat from the side against which the plastic is to be attached, instead of through the plastic itself, as is common in the old practice of laminating by heat and pressure, and by shrinking the plastic into that base by chilling it from the bottom and through the base, instead of chilling from the top and through the plastic, an inseparable and very intimate bond is obtained between cellulose ester compounds and even such dense, smooth surfaces as highly polished nickel plate, for instance, without the use of gums, resins, or any other adhesive aids and without priming or otherwise preparing the surface of the base, the bond being superior to that obtained by any of the old methods of coating, painting or spraying of liquefied cellulose ester compounds, containing even very high percentages of such adhesive substances, or of applying same to a primed or otherwise prepared surface.

*Example III*

The following is an example of a method of applying coatings to the periphery of articles having cylindrical or rod-like shapes, such as wires and moldings, particular reference being made to the coating of pencils as is shown in Figs. 3 and 4.

A powder comprising cellulose acetate, plasticizer and pigment made as described in Example II is placed in the hopper 1 and is formed into a sheet A of plastic by passing between the heated rolls 2, 3 and 4 as described in Example I, and then between the heated rolls 20 and 21, which are provided with the registering grooves 22, but which are spaced closely together so as to prevent flow of the plastic between the rolls at points other than at the passage formed by the registering grooves 22. The rolls 20 and 21 are heated to a temperature of about 165° C.

The pencils D to be coated are fed from the magazine 23 to the conveyor 24 whose lugs 25 propel them through the chamber 26 where they are warmed to a temperature of about 75 to 80° C. The preheated pencils then pass through the passage formed by the grooves 22 of the rolls 20 and 21, where they are coated with a uniform layer of plastic A of predetermined thickness. The coated pieces are then passed through the cooling chamber 27. The coating has a natural tendency to shrink around the porous wooden pencils of small diameter.

Many advantageous variations of the above described process may be made. For instance, paper or cardboard coated with cellulose derivative compositions are largely used for making boxes or other containers. Heretofore it was necessary to apply lacquer containing cellulose derivatives to such articles by off-set printing because of the necessity to leave uncoated spots or edges where the paper was to be joined to make the containers, so that the ordinary glue or adhesive used in automatic or container-forming machinery could effectively grip and bind the parts. By suitably engraving or embossing the roll 5 of Fig. 1, or by adding an extra roll, whereby the spots or spaces which are to be left uncoated are raised on the roll, it is possible to deposit a protective or decorative coating of cellulose derivative plastic on the paper having bare spots, thus permitting the use of the slow drying odorless adhesives ordinarily employed in automatic wrapping and container-forming machines.

A further variation of the same method of application can be adapted to the creation of special effect materials, where the cellulose ester composition is to cover another base in a well defined design only, leaving the base exposed in places, to form the background. Materials so prepared, whether of a paper, fabric, or other base, will take on a two-tone finish in embossing, dyeing, or in any other treatment, which they may subsequently receive, as the cellulose esters and the background forming base will naturally assume a different appearance under the same treatment. The results obtained are far superior and far more effective than those obtained by printing, which cannot be done with cellulose ester compositions anyhow, on account of the difficulty in preparing suitable ester inks or roller solutions.

Embossed and/or multi-colored finishes or effects, such as leather grains, fabric weaves, plastic finishes, fancy designs, so-called Spanish two-tone and reptile skin reproductions, may be made by employing a roll having the proper design engraved or embossed thereon to press the plastic material on to the fabric, paper or other base, or by interposing printing or embossing rolls, decalcomania stencils or combinations of these.

Variegated, marbled, mottled, striped and checkered effects of controlled design may be obtained by supplying from the hopper I properly balanced and predetermined quantities of plastic material in various colors and forms, such as powders, ribbons, chips, cubes and the like.

Appliqué, intarsia, brocade, cloisonné and similar effects may be obtained by feeding together with, and embedding in, the plastic layer, such materials as tinsel, fretwork effects, die-cut flowers or any other decorative designs, stamped or worked from metal, foil, paper, cloth or any other suitable material.

Suède, velvet, pebble, pearl, bead and irridescent finishes may be produced by the embedding in the hot surface of the plastic layer prior to chilling, of such substances as cotton or rayon flock, finely ground glass, fish scale essence, bronze powder, metallic salts and similar effect materials.

When applied to embossed, metallic or other hard surfaces, the cellulose derivative composition may be caused to fill only the depressions, leaving the raised portions uncoated, thereby creating inlay enamel effects.

The use of my invention is attendant with many advantages. The use of volatile solvents with their attendant expense and fire and health hazard are eliminated. It is possible by my invention to deposit in a single operation a layer of cellulose ester material of a thickness up to 0.025" or more, which would normally require about 20 successive coatings of a liquid coating composition. The plastic is more firmly anchored to the base than is possible with the use of the liquid coating composition due to the lifting action of evaporating solvents. It is possible to use cellulose derivatives of high viscosity characteristics in this invention as contracted with the use of liquid coating compositions which are limited to the use of low viscosity cellulose derivatives. The product is free of air bubbles, checking, crazing, solvent blush, uneven levelling of the dope, excessive penetration, bleeding and other imperfections occurring in the materials treated by the older methods.

Even thin coats of plastic material give perfect coverage and superior hiding power due to the fact that the surface of the coat has the smooth roller finish, instead of following the contours of the fabric base structure.

The coatings on metal produced by this invention are perfectly adherent to even highly polished dense-grain metallic surfaces, despite the fact that no adhesive agents such as gums or resins are employed. Such composited metal can be stamped and drawn without harmful effect, since the cellulose derivative coating is actually backed and shrunk on and will not crack, chip or check from the metal, but will produce a clean edge and actually flow with the metal when stamped in cutting dies or when molded into shape in deep drawing dies or when rolled, milled, knurled or otherwise subjected to severe mechanical treatment.

Rough rigid surfaces such as wood, asbestos board or composition board may have a smooth surface coating imparted thereto by this invention without the use of any filling or priming compounds.

It is to be understood that the foregoing detailed description is given merely by way of illustration and that many variations may be made therein without departing from the spirit of my invention.

Having described my invention, what I desire to secure by Letters Patent is:

1. The method of coating surfaces of non-thermoplastic fabric with layers of thermoplastic compositions comprising continuously preheating said non-thermoplastic fabric to remove traces of moisture therefrom and then continuously causing a layer of thermoplastic composition comprising a derivative of cellulose to adhere directly to such preheated fabric by the application of heat and pressure.

2. The method of coating surfaces of non-thermoplastic fabric with layers of thermoplastic compositions comprising continuously preheating said non-thermoplastic fabric to remove traces of moisture therefrom, continuously preheating a layer of thermoplastic composition comprising a derivative of cellulose and then continuously causing said layer of thermoplastic composition to adhere directly to said preheated non-thermoplastic fabric by the application of pressure.

3. The method of coating surfaces of non-thermoplastic material with layers of thermoplastic compositions comprising superposing a layer of a thermoplastic composition comprising a derivative of cellulose on said non-thermoplastic surface and applying heat and pressure by means of surfaces, the surface contacting with the non-thermoplastic material being at a higher temperature than the surface contacting with the thermoplastic composition.

4. The method of coating surfaces of non-thermoplastic material with layers of thermoplastic compositions comprising preheating said non-thermoplastic surface, superposing a layer of a thermoplastic composition comprising a derivative of cellulose on said non-thermoplastic surface and applying heat and pressure by means of surfaces, the surface contacting with the non-thermoplastic material being at a higher temperature than the surface contacting with the thermoplastic composition.

5. The method of coating surfaces of non-thermoplastic material with layers of thermoplastic compositions comprising preheating said non-thermoplastic surface, preheating a layer of thermoplastic composition comprising a derivative of cellulose, superposing said layer of thermoplastic composition on said non-thermoplastic surface and applying heat and pressure by means of surfaces, the surface contacting with the non-thermoplastic material being at a higher temperature than the surface contacting with the thermoplastic composition.

6. The method of coating surfaces of non-thermoplastic fabric comprising continuously forming sheets, films or foils by passing a composition comprising a derivative of cellulose and plasticizer between heated rolls, continuously contacting the same directly with a non-thermoplastic fabric preheated to remove traces of moisture therefrom and applying pressure.

7. The method of coating surfaces of non-thermoplastic material comprising forming sheets, films or foils by passing a composition comprising a derivative of cellulose and plasticizer between heated rolls, contacting the same with the surface of a non-thermoplastic material and applying pressure by means of surfaces, the surface contacting with the non-thermoplastic surface being at a higher temperature than the surface contacting with the thermoplastic composition.

8. The method of coating surfaces of non-thermoplastic material comprising forming sheets, films or foils by passing a composition comprising a derivative of cellulose and plasticizer between heated rolls, contacting the same with a preheated surface of a non-thermoplastic material and applying pressure by means of surfaces, the surface contacting with the non-thermoplastic surface being at a higher temperature than the surface contacting with the thermoplastic composition.

9. The method of coating surfaces of non-thermoplastic material with layers of thermoplastic compositions comprising causing a layer of a thermoplastic composition comprising a derivative of cellulose substantially free of volatile solvent to adhere directly to such surfaces by the application of heat and pressure and then applying a cooling medium to the back only of the non-thermoplastic material.

10. The method of coating surfaces of non-thermoplastic material comprising continuously forming sheets, films or foils with the aid of heat from a composition comprising a derivative of cellulose, continuously causing the same to adhere to said non-thermoplastic surface solely by the application of heat and pressure and applying a cooling medium to the back only of the non-thermoplastic material.

11. The method of coating surfaces of non-thermoplastic material with layers of thermoplastic compositions comprising preheating said non-thermoplastic surface, then causing a layer of thermoplastic composition comprising a derivative of cellulose to adhere directly to such preheated surface by the application of heat and pressure and then applying a cooling medium to the back only of the non-thermoplastic material.

12. The method of coating surfaces of non-thermoplastic material with layers of thermoplastic compositions comprising superposing a layer of a thermoplastic composition comprising a derivative of cellulose on said non-thermoplastic surface, applying heat and pressure by means of surfaces, the surface contacting with the non-thermoplastic material being at a higher temperature than the surface contacting with the thermoplastic composition and then cooling through the back of the non-thermoplastic material.

13. The method of coating surfaces of non-thermoplastic material comprising forming sheets, films or foils by passing a composition comprising a derivative of cellulose and plasticizer between heated rolls, contacting the same with a preheated non-thermoplastic surface, applying pressure and then applying a cooling medium to the back only of the non-thermoplastic material.

14. The method of coating surfaces of non-thermoplastic material comprising forming sheets, films or foils by passing a composition comprising a derivative of cellulose and plasticizer between heated rolls, contacting the same with the surface of a non-thermoplastic material and applying pressure by means of surfaces, the surface contacting with the non-thermoplastic surface being at a higher temperature than the surface contacting with the thermoplastic composition and then cooling through the back of the non-thermoplastic material.

HENRY JENETT.

CERTIFICATE OF CORRECTION.

Patent No. 2,070,600.     February 16, 1937.

HENRY JENETT.

It is hereby certified that error appears in the printed specification of the above numbered patent requiring correction as follows: Page 5, first column, line 71, for the word "contracted" read contrasted; page 6, second column, line 6, claim 10, before the syllable "apply-" insert then; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.

thermoplastic material with layers of thermoplastic compositions comprising preheating said non-thermoplastic surface, preheating a layer of thermoplastic composition comprising a derivative of cellulose, superposing said layer of thermoplastic composition on said non-thermoplastic surface and applying heat and pressure by means of surfaces, the surface contacting with the non-thermoplastic material being at a higher temperature than the surface contacting with the thermoplastic composition.

6. The method of coating surfaces of non-thermoplastic fabric comprising continuously forming sheets, films or foils by passing a composition comprising a derivative of cellulose and plasticizer between heated rolls, continuously contacting the same directly with a non-thermoplastic fabric preheated to remove traces of moisture therefrom and applying pressure.

7. The method of coating surfaces of non-thermoplastic material comprising forming sheets, films or foils by passing a composition comprising a derivative of cellulose and plasticizer between heated rolls, contacting the same with the surface of a non-thermoplastic material and applying pressure by means of surfaces, the surface contacting with the non-thermoplastic surface being at a higher temperature than the surface contacting with the thermoplastic composition.

8. The method of coating surfaces of non-thermoplastic material comprising forming sheets, films or foils by passing a composition comprising a derivative of cellulose and plasticizer between heated rolls, contacting the same with a preheated surface of a non-thermoplastic material and applying pressure by means of surfaces, the surface contacting with the non-thermoplastic surface being at a higher temperature than the surface contacting with the thermoplastic composition.

9. The method of coating surfaces of non-thermoplastic material with layers of thermoplastic compositions comprising causing a layer of a thermoplastic composition comprising a derivative of cellulose substantially free of volatile solvent to adhere directly to such surfaces by the application of heat and pressure and then applying a cooling medium to the back only of the non-thermoplastic material.

10. The method of coating surfaces of non-thermoplastic material comprising continuously forming sheets, films or foils with the aid of heat from a composition comprising a derivative of cellulose, continuously causing the same to adhere to said non-thermoplastic surface solely by the application of heat and pressure and applying a cooling medium to the back only of the non-thermoplastic material.

11. The method of coating surfaces of non-thermoplastic material with layers of thermoplastic compositions comprising preheating said non-thermoplastic surface, then causing a layer of thermoplastic composition comprising a derivative of cellulose to adhere directly to such preheated surface by the application of heat and pressure and then applying a cooling medium to the back only of the non-thermoplastic material.

12. The method of coating surfaces of non-thermoplastic material with layers of thermoplastic compositions comprising superposing a layer of a thermoplastic composition comprising a derivative of cellulose on said non-thermoplastic surface, applying heat and pressure by means of surfaces, the surface contacting with the non-thermoplastic material being at a higher temperature than the surface contacting with the thermoplastic composition and then cooling through the back of the non-thermoplastic material.

13. The method of coating surfaces of non-thermoplastic material comprising forming sheets, films or foils by passing a composition comprising a derivative of cellulose and plasticizer between heated rolls, contacting the same with a preheated non-thermoplastic surface, applying pressure and then applying a cooling medium to the back only of the non-thermoplastic material.

14. The method of coating surfaces of non-thermoplastic material comprising forming sheets, films or foils by passing a composition comprising a derivative of cellulose and plasticizer between heated rolls, contacting the same with the surface of a non-thermoplastic material and applying pressure by means of surfaces, the surface contacting with the non-thermoplastic surface being at a higher temperature than the surface contacting with the thermoplastic composition and then cooling through the back of the non-thermoplastic material.

HENRY JENETT.

---

CERTIFICATE OF CORRECTION.

Patent No. 2,070,600.      February 16, 1937.

HENRY JENETT.

It is hereby certified that error appears in the printed specification of the above numbered patent requiring correction as follows: Page 5, first column, line 71, for the word "contracted" read contrasted; page 6, second column, line 6, claim 10, before the syllable "apply-" insert then; and that the said Letters Patent should be read with these corrections therein that the same may conform to the record of the case in the Patent Office.

Signed and sealed this 23rd day of March, A. D. 1937.

(Seal)      Henry Van Arsdale
Acting Commissioner of Patents.

CERTIFICATE OF CORRECTION.

Patent No. 2,070,600.                                February 16, 1937.

HENRY JENETT.

It is hereby certified that error appears in the printed specification of the above numbered patent requiring correction as follows: Page 5, first column, line 71, for the word "contracted" read contrasted; page 6, second column, line 6, claim 10, before the syllable "apply-" insert then; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.